Aug. 9, 1927.
P. A. DUNKEL
1,638,801
RESILIENT VEHICLE WHEEL
Filed Jan. 14, 1926
2 Sheets-Sheet 1
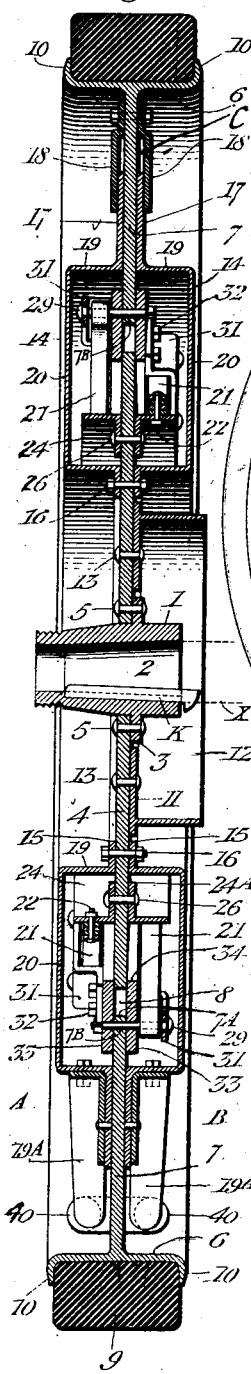
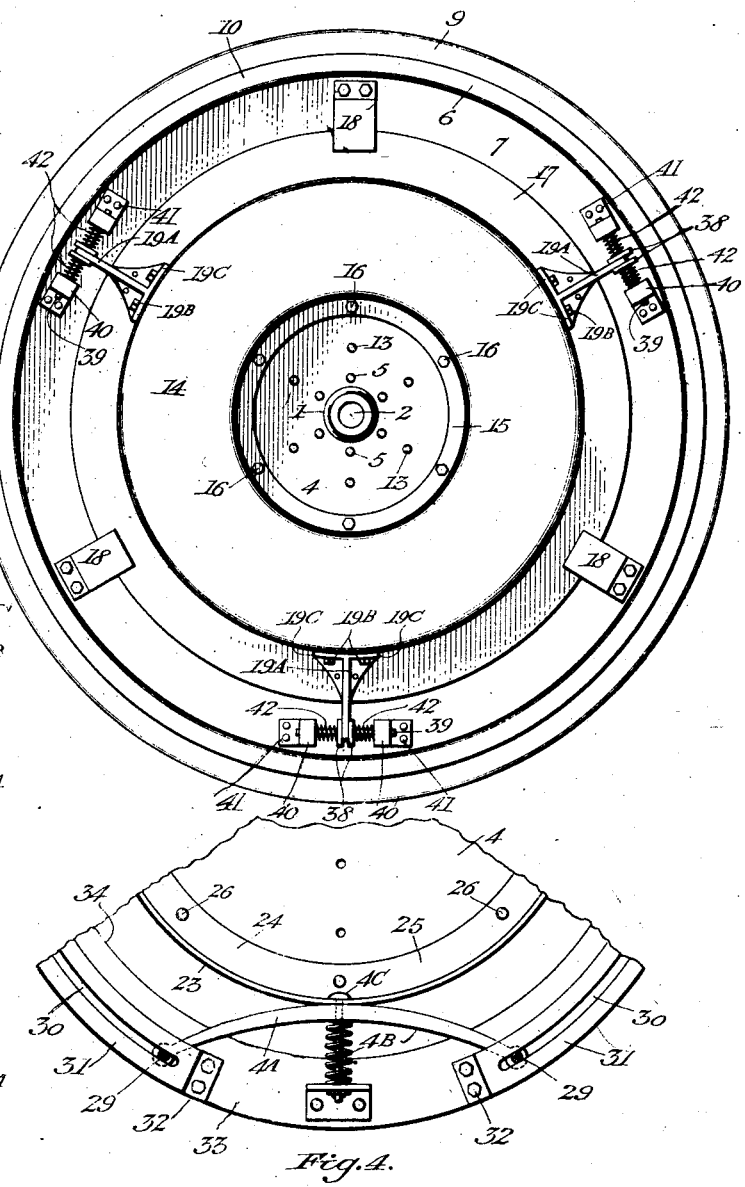
Inventor:
Phillip A. Dunkel.
By H. S. Bailey, Attorney

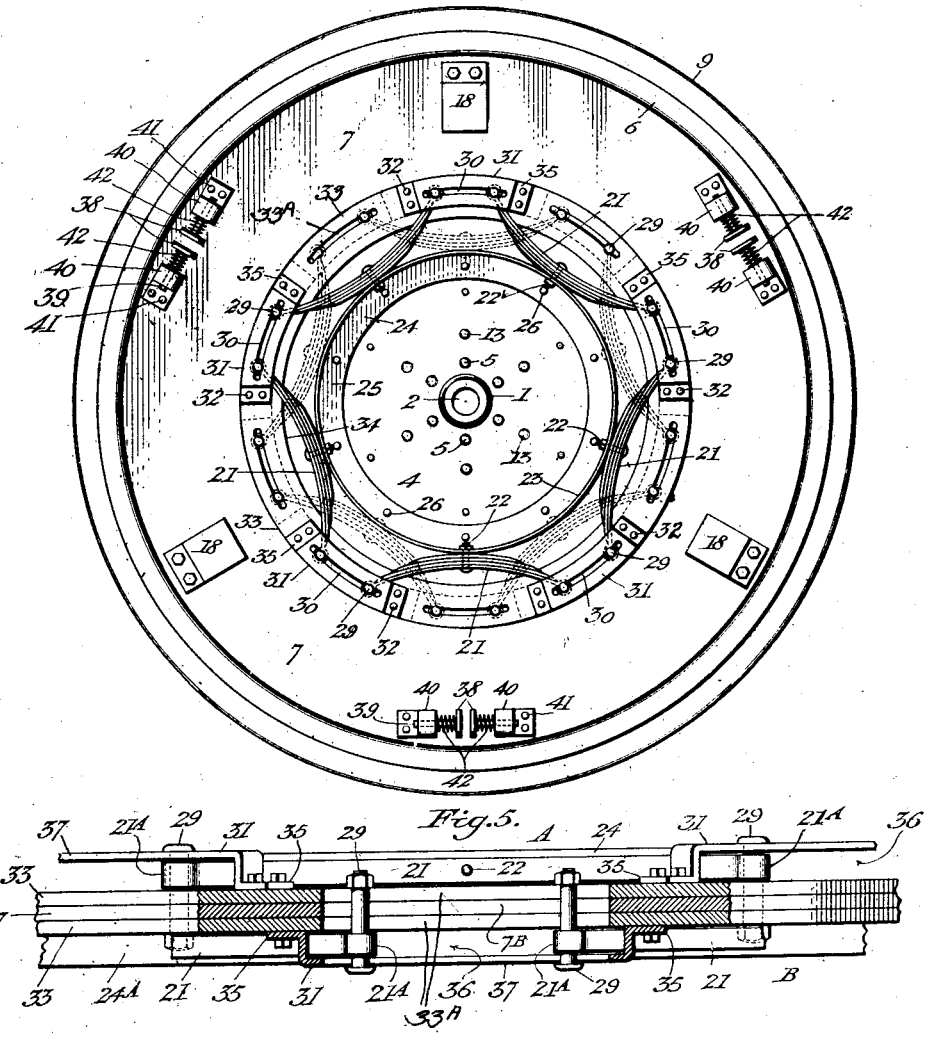

Patented Aug. 9, 1927.

1,638,801

UNITED STATES PATENT OFFICE.

PHILLIP A. DUNKEL, OF DENVER, COLORADO.

RESILIENT VEHICLE WHEEL.

Application filed January 14, 1926. Serial No. 81,227.

My invention relates to a new type of a resilient vehicle wheel, for all classes of vehicles.

And the objects of my invention are:

First: To provide a resilient vehicle wheel that automatically cushions vertical and tangential pressure.

Second: To provide a resilient vehicle wheel that provides an automatically operating resilient cushion that so thoroughly absorbs the shocks and jars of uneven roads that the use of a pneumatic tire is not necessary.

Third: To provide a resilient vehicle wheel that is simple in construction, and that can be constructed at small expense, and that is of such strong construction that it is not liable to get out of working order, said wheel having its hub provided with a brake drum.

I attain these objects by the mechanism illustrated in the accompanying drawings, in which:—

Fig. 1, is a side elevation of my resilient vehicle wheel.

Fig. 2, is a vertical diametrical section through the center of my resilient vehicle wheel.

Fig. 3, is a side elevation of my resilient vehicle wheel, with the housing plate that covers the springs at the side of wheel removed.

Fig. 4, is a fragmentary view of the supporting members of each spring showing a single leaf form of spring and a reinforcing coiled spring with its confining bolt arranged to strengthen the leaf spring.

Fig. 5, is a fragmentary view partially in section showing the pivotal bolts of the ends of each spring and their supporting plates.

Similar letters of reference refer to similar parts throughout the several views.

Referring to the drawings, the numeral 1, designates the hub of my resilient vehicle wheel; it is provided with an axial receiving bore 2, and with a narrow flange 3, to which a circular flange 4, is riveted by rivets 5 and this flange 4 extends to about two thirds of the distance to the rim 6, which is provided with an annular flange 7, which surrounds the flange 4 but is separated from the same by a space 8. The rim 6 has mounted thereon a solid rubber tire 9, which is held in place by parallel flanges 10 on the said rim.

To the inner portion of the flange 4, I secure the flange portion 11, of a brake-drum 12, by rivets 13, and just beyond the brake drum I secure to the flange 4 the inner edge portions 15 of two circular housing plates 14 by bolts 16 and the flat peripheral portions 17 of these housing plates extend over and in contact with the opposite sides of the rim flange 7, and are held in slidable relation with said flange by clips 18, which are bolted to the flange and extend over the portions 17 of the housing plates, as clearly shown in Figures 1 and 2. Each housing plate 14 comprises a flat annular portion 15 which is bolted to the flange 4; a flat annular portion 17 which lies against one side of the rim flange 7 and beneath the clips 18, and an annular portion U-shaped in cross section which is pressed out from the plate to form annular walls 19 at right angles to the flat portions 15 and 17 and a flat side wall 20, as shown.

I can use a spring 4$^A$, that is made of one piece of spring steel, that is thicker at its middle than at its ends, as shown in Fig. 4, which has a center supporting coiled spring 4$^B$, on its center bolt 4$^C$, 'or the springs 21, may be used, each composed of two or three flat strips of spring steel as shown in Fig. 3, which type of spring is called a leaf spring, and it is also made thicker at its middle portion than at its ends; and the springs 21, whether they are made of two or more lengths of spring steel, are secured at the middle portion of their lengths by bolts 22 to the outwardly projecting members 23, of angle-bar rings 24 and 24$^A$ of which there are two, one on each side of the flange 4 to which their vertical sides 25, are both secured by rivets 26 and the angle bar ring 24 is shown plainly in Fig. 3, secured to the flange 4 with the five springs 21, on the side A of the resilient vehicle wheel bolted to the member 23 of the angle bar ring 24 by the bolts 22.

The opposite terminal ends 21$^A$ of the springs 21 are secured pivotally to bolts 29 which are slidably mounted in slots 30 that are formed through plates 31 that are rigidly secured by bolts 32, to flat rings 33 of which there are two, one on each side of the flange 7, to which they are loosely secured by bolts 29; their inner edges 34 however, overlap, the outer peripheral edge of the flange 4, which has a sliding movement between them when the hub and this flange move under a jarring movement towards the rim 6.

The plates 31 which are provided with the slots 30 in which the bolts 29 are slidably mounted to allow the ends of the springs 21 to move further apart as the middle portions of these springs are pushed outward; are of yoke shape, as shown in the fragmentary sectional view in Fig. 5; and they are provided with feet members 35 at their opposite ends which rest on and are secured to the rings 33 by the bolts 32 and as the plates 31 are of yoke shape there is a space 36 underneath their raised plate portion 37 in which the slots 30 are formed and the opposite ends of the springs 21 project loosely into this space 36 between the raised plate portions 37 and the adjacent side of the flat rings 33, and the bolts 29 that extend from the side B of the resilient vehicle wheel, extend through slots $33^A$ in both of the rings 33 and also through a slot $7^B$ formed in the flange 7, into the opposite ends of all of the springs 21 on the side A of the resilient wheel and the bolts 29 that extend from the side A of the resilient vehicle wheel extend through slots $33^A$ and $7^B$ in both flat rings 33, and the flange 7 respectively and through the ends of all of the springs 21 on the side B, of the resilient vehicle wheel in alternate order of arrangement throughout the circumference of the wheel as the springs on one side of the wheel are placed in intermediate positions between those on the other side; and consequently they co-operatingly act to automatically impart a resilient cushioning tension at all times between the hub and the flange 4 and the rim 6 and its flange 7 to which these springs 21 are alternately secured through the medium of the flat rings 33 and the angle bar rings 24 and $24^A$. The circumferential space 8, between the outer edge of the flange 4, and the inner edge $7^A$ of the flange 7 allows the hub and its flange 4 to move under sudden loads and jars towards the flange 7 by compressing the springs 21 in the momentarily lower half of the wheel and expanding them in the momentarily upper half of the wheel and a similar compensation movement space C, is provided within the clips 18 for the free peripheral portions 17 of the yoke shaped housing plates 14.

In order to prevent any circumferential movement of the hub and its flange independent of or ahead of the circumferential movement of the rim 6 and its flange 7, I provide the latter flange and the outer portions 17 of the housing plates 14 with a resilient mechanism that acts to hold the two parts of my resilient vehicle wheel in firm operating relation and one compensating for the bumps and dragging action of the tire and the rim and its flange 7 in relation to the rotary movement of the hub and its flange 4 and the springs and the side plates and other parts of the wheel that are secured to it, some of which would have to take this strain alone if this resilient mechanism were not provided to receive it, as the hub is keyed to the axle X by the key K; and the axle, not shown is driven by a motor, or other means not shown; and the hub 1, the flange 4 and the side plates 14, drive the flange 7 and the rim 6 and its tire 9, by arms $19^A$ and springs 42; and this resilient rim and tire driving mechanism consists of arms $19^A$, of which there are three, which are placed at three equally spaced points around the wheel; and these arms $19^A$ project from the annular wall 19, of the housing plates 14 to which they are bolted by bolts $19^B$ the arms being provided with right angled feet members $19^C$ through which the bolts pass and which rigidly clamp the arms to the side plates. Each of the arms $19^A$ extend to and between two discs 38, which are mounted on the ends of stems 39 that are slidably mounted in boxes 40, that are secured to the flange 7 by rivets 41 midway between the clips 18, and the stems 39 extend in opposite directions from their discs through their supporting boxes which are placed at a short distance from the discs 38 and on the stems 39 I mount stiff coiled springs 42 that receive the thrust and resist and cushion the movement of one or the other of the discs which would be caused by a movement of the arm thereagainst, due to the difference in the slight circumferential movement of the hub and its flange 4 and the members that are secured to it and the tire and the rim and its flanges and the clips that are secured to it; when running over rough roads which tend to cause the tire and the rim and their flange 7 to drag behind the rotary movement of the hub and its flange and the members that are secured to it.

My resilient wheel is practically a two piece resilient vehicle wheel in which the hub and the flange 4 and the parts that are secured to the flange 4 form one part of the wheel, and the tire and the rim and the flange 7 and the parts that are secured to the last named flange form the other part of it; and while I have illustrated and described the preferred construction and arrangement of my resilient vehicle wheel, I do not wish to be limited to it as changes may be made in it without departing from the spirit of my invention.

Having described my invention what I claim as new and desire to secure by Letters Patent is:—

1. A resilient vehicle wheel comprising a hub having a flange, springs secured upon said hub flange, a rim having a flange, flat rings on opposite sides of said rim flange, slotted plates secured to said rings, bolts extending through said slotted plates, through the ends of said springs, and through slots in said rings and said rim flange; circular housing plates secured to the hub flange having radial arms, resilient abutments on the rim flange which bear against opposite sides of said arms and clips on the rim flange which overlap the marginal edges of said housing plates.

2. In a resilient vehicle wheel, the combination with a hub having a circular flange and a rim having an annular flange which surrounds the hub flange but is spaced from the same; of flat rings on opposite sides of said flanges which cover the space between said flanges, said rings and said rim flange having registering arcuate slots, bolts extending through said slots, half elliptic springs which are connected at their ends to said bolts and intermediate of their ends to the hub flange, radial arms carried by said hub flange and resilient abutments on said rim flange which are engaged by said arms.

3. In a resilient wheel, a hub having a circular flange, a rim having an annular flange which surrounds the hub flange and is spaced therefrom, flat rings secured to opposite sides of the rim flange and overlapping the hub flange, half elliptic springs connected at their centers to the hub flange, their ends being movably connected to the said flat rings, circular housing plates secured to opposite sides of the hub flange and overlapping the rim flange, clips on the rim flange which overlap the outer portions of the said housing plates and hold them in contact with the rim flange, radial projections on said housing plates, and resiliently mounted abutments on the rim flange in engagement with opposite sides of said radial projections.

4. A resilient vehicle wheel comprising a rim having an annular flange, a hub having a circular flange which lies within but is separated from the rim flange by an annular space, half elliptic springs secured at their center portions to the hub flange and arranged in alternate order on the opposite sides of said flange, means for connecting the ends of said springs to the rim flange in a manner to permit a lengthening and shortening action of said springs, means for holding the hub and rim flanges in radial alinement, radial elements movable with the hub portion of the wheel and yielding abutments on the rim flange in engagement with opposite sides of said radial elements.

5. In a resilient wheel, the combination with a rim having an annular flange and a hub having a circular flange positioned within the rim flange but separated from the same by an annular space, said rim flange having a circular series of arcuate slots; of flat rings on opposite sides of said flanges and covering the space between said flanges, said rings having arcuate slots which register with the slots in the rim flange, bolts extending through said slots, half elliptic springs which are secured at their central portions to the hub flange and are arranged in alternate order on opposite sides of said flange, their ends being secured to said bolts, circular housing plates secured to opposite sides of the hub flange and extending partially over the rim flange, guides on the rim flange which overlap the outer portions of said housing plates, radial arms on said housing plates, and spring pressed abutments on the rim flange which engage the opposite side of said radial arms.

6. A resilient wheel comprising a hub having a circular flange, a rim having an annular flange which surrounds the hub flange but is spaced therefrom, circular angle plates, secured to opposite sides of the hub flange, flat rings secured to opposite sides of the rim flange and overlapping the hub flange, leaf springs secured at their center portions to said circular angle plates, their outer ends having a sliding connection with said flat rings and said rim flange, housing plates secured to opposite sides of the hub flange and overlapping the rim flange pairs of supports on opposite sides of the rim flange, spring cushioned pins in each pair of supports and radial arm on said housing plates which extends between the pairs of spring cushioned pins.

In testimony whereof I affix my signature.

PHILLIP A. DUNKEL.